US008843558B2

(12) United States Patent
Murphy, Jr. et al.

(10) Patent No.: US 8,843,558 B2
(45) Date of Patent: Sep. 23, 2014

(54) CALENDARING TOOL WITH OPTIMIZED MANAGEMENT CAPABILITIES

(75) Inventors: Thomas E. Murphy, Jr., Hopewell Junction, NY (US); Deborah A. Odell, Staatsburg, NY (US)

(73) Assignee: International Business Machines Corporation, Armonk, NY (US)

(*) Notice: Subject to any disclaimer, the term of this patent is extended or adjusted under 35 U.S.C. 154(b) by 131 days.

(21) Appl. No.: 13/345,853

(22) Filed: Jan. 9, 2012

(65) Prior Publication Data

US 2013/0179501 A1 Jul. 11, 2013

(51) Int. Cl.
*G06F 15/16* (2006.01)
*G06Q 10/10* (2012.01)
*H04L 29/06* (2006.01)

(52) U.S. Cl.
CPC .......... *G06Q 10/109* (2013.01); *G06Q 10/1095* (2013.01); *H04L 65/403* (2013.01); *H04M 2203/5054* (2013.01)
USPC .......................................... 709/204; 709/205

(58) Field of Classification Search
CPC ............ G06Q 10/109; G06Q 10/1093; G06Q 10/1095; H04L 65/403; H04M 2203/5054; H04M 2203/5063; H04M 2203/5072
USPC .................. 709/200–205, 217–227, 228, 229
See application file for complete search history.

(56) References Cited

U.S. PATENT DOCUMENTS 5,124,912 A 6/1992 Hotaling et al.
6,370,566 B2 * 4/2002 Discolo et al. ................ 709/206
6,816,863 B2 11/2004 Bates et al.
6,870,916 B2 3/2005 Henrikson et al.
7,082,402 B2 7/2006 Conmy et al.
7,602,893 B2 * 10/2009 Bhatia et al. ............. 379/202.01
7,840,543 B2 * 11/2010 Guiheneuf et al. ........... 707/695
8,239,234 B2 * 8/2012 Guiheneuf et al. .......... 705/7.18
8,358,762 B1 * 1/2013 Renner et al. ............ 379/202.01
2003/0233265 A1 12/2003 Lee et al.
2005/0125246 A1 * 6/2005 Muller et al. ..................... 705/1
2007/0005406 A1 * 1/2007 Assadian et al. .................. 705/8
2010/0217644 A1 * 8/2010 Lyle et al. ......................... 705/8
2011/0295641 A1 * 12/2011 Guiheneuf et al. .......... 705/7.19
2012/0150956 A1 * 6/2012 Tucker et al. ................ 709/204
2012/0191500 A1 * 7/2012 Byrnes et al. ................ 705/7.19
2013/0013365 A1 * 1/2013 Mansour ...................... 705/7.19
2013/0024233 A1 * 1/2013 Aaron et al. ................. 705/7.19
2013/0041953 A1 * 2/2013 Renner et al. ................. 709/204

OTHER PUBLICATIONS

"CAIS: Collaborative Asynchronous Inspection of Software", by V. Mashayekhi et al, 1994 ACM, pp. 21-34.

(Continued)

*Primary Examiner* — Moustafa M Meky
(74) *Attorney, Agent, or Firm* — William A. Kinnaman, Jr.

(57) ABSTRACT

A computer-implemented method, apparatus and computer-readable storage device for arranging a meeting in a networked environment having nodes assigned to respective individual users. Upon receiving a set of meeting requirements including at least a meeting time and a set of invitees from a user at one of the nodes, invitations for a meeting at the meeting time are sent to at least a subset of the invitees based on one or more of the meeting requirements. The meeting is confirmed at the meeting time responsive to receiving acceptances from a predetermined subset of the invitees, such as a set of invitees identified as being critical invitees or a number of invitees constituting a quorum, and is rescheduled or cancelled responsive to a failure to receive acceptances from the predetermined subset of the invitees.

6 Claims, 3 Drawing Sheets

210 RECEIVE LIST
220 RECEIVE PARTICIPANT CATEGORIES/ NUMBERS
230 ENABLE PRE-REQUEST
240 SEND PRE-REQUEST
250 SET INDICATOR
260 RESPONSE MISSING?
270 MODIFIED?
275 ACCEPTED?
277 RESCHEDULED ?
278 CANCEL MEETING
280 RESET INDICATOR
285 SEND MEETING NOTICE
286 ACCEPTED?
GO TO 277
290 SCHEDULE MEETING

(56) References Cited

OTHER PUBLICATIONS

"GroupTime: Preference-Based Group Scheduling", by M. Brzozowski et al, CHI 2006, Apr. 22-27, 2006, 2006 ACM, pp. 1047-1056.

"An Empirical Study of the Use of Visually Enhanced VoIP Audio Conferencing: The Case of IEAC", by X. Ding et al, CHI 2007, Apr. 28-May 3, 2007, 2007 ACM, pp. 1010-1028.

* cited by examiner

310 ID
320 DATE
330 TIME
340 LOCATION
350 INVITEE ADDRESS
360 CRITICAL LIST
370 RESPONSE
380 RECORD STATE

FIG.3

CALENDARING TOOL WITH OPTIMIZED MANAGEMENT CAPABILITIES

BACKGROUND OF THE INVENTION

1. Field of the Invention

This invention relates generally to a calendaring tool and more particularly to a calendaring tool that allows invitees to respond to a meeting request before the system automatically sends out an invitation to all attendees.

2. Description of the Related Art

In recent years, with the advent of the Internet and other communications tools, more businesses rely on computerized calendaring tools to set up both virtual and in-person meetings. One reason for this increased reliance is that the attendees to a meeting can be numerous and scattered around the world. Therefore it is cumbersome to set up these meetings individually and without the use of a computer. In addition, automated and virtual calendaring tools enable information about the meeting to be accurately forwarded to all participants. This is very convenient for the meeting attendees, who can also store this information digitally and use it at the time of the meeting.

Unfortunately, despite calendaring tools that allow for checking of attendees' availability ahead of time, calendars are not always kept accurately. Much time and resources are spent in setting up meetings. Nonetheless, last-minute scheduling conflicts can arise when emergencies cause invitees to change their attendance status at the very last minute. These scheduling challenges create a variety of problems and issues. The first set of problems has to do with scheduling and rescheduling of the calendars so that a first set of attendees deemed to be critical for the meeting can be present. The second set of problem occurs in situations where a quorum of attendees has to be present for the meeting to commence due to particular reasons. In most cases, these problems are resolved either by in-person calling or by sending numerous sets of e-mails and other messages to all participants on a continuous basis. This is an inefficient use of time and resources. In addition, the continuous stream of e-mails causes network and other types of digital clutter, which is difficult to manage both for the invitees and for the originator of the meeting. Notwithstanding all this, any last-minute cancellations or scheduling conflicts create hard-to-resolve difficulties for the originator of the meeting.

Consequently, an improved calendaring tool is needed that can automate the process of scheduling meetings and updating them as needed.

SUMMARY OF THE INVENTION

The shortcomings of the prior art are overcome and additional advantages are provided through the provision of a calendaring tool, method and associated computer-readable medium for arranging meetings in a computing environment having at least one processor. The tool comprises a scheduling mechanism operable to permit a meeting to be arranged at a given time between two or more participants and has one or more fields including requirements for sending and receiving messages relating to meeting invitations. It also comprises an indicator operable to indicate a tentative status when a meeting invitation is sent to at least a subset of invitees in accordance with requirements and a confirmed status when responses are received from all invited participants. The mechanism is enabled to send meeting invitations to at least a subset of invitees selectively and is also enabled to receive responses back from the invitees. In addition, the mechanism is also enabled to finalize the meeting invitation or, alternatively, enabled to send additional invitations or information selectively to all or a subset of participants according to the status of the indicator and other information provided by the requirement field(s).

More particularly, embodiments of the invention relate to a computer-implemented method, apparatus and computer-readable storage device for arranging a meeting in a networked environment having nodes assigned to respective individual users, each of the nodes comprising one or more processors, the method being performed by one or more processors at one of the nodes and comprising. Upon receiving a set of meeting requirements from a user at one of the nodes, the requirements including at least a meeting time and a set of invitees, invitations for a meeting at the meeting time are sent to at least a subset of the invitees at the nodes of the networked environment assigned to the invitees based on one or more of the meeting requirements. The meeting is confirmed at the meeting time responsive to receiving acceptances from a predetermined subset of the invitees at the nodes of the networked environment assigned to the invitees, and is rescheduled or cancelled responsive to a failure to receive acceptances from the predetermined subset of the invitees at the nodes of the networked environment assigned to the invitees.

Optionally, the rescheduling or cancelling is performed responsive to a failure to receive acceptances from the predetermined subset of the invitees within a predetermined period of time. Optionally, the meeting requirements identify each invitee as being either a critical invitee or a noncritical invitee, and meeting is confirmed responsive to receiving acceptances from all of the invitees identified as being critical invitees. Optionally in such a case, invitations are sent only to the invitees identified as being critical invitees, and invitations are sent to the invitees identified as being noncritical invitees as part of the confirmation step. The rescheduling or cancelling may also be performed responsive to receiving a refusal from an invitee identified as being a critical invitee.

Alternatively, and optionally, the requirements specify a quorum of invitees attending the meeting, and the meeting is confirmed responsive to receiving acceptances from a number of invitees constituting the quorum, and rescheduled or cancelled responsive to receiving refusals from a number of invitees sufficient to defeat the quorum.

Optionally, the progress of the invitation procedure may be tracked by initially setting a state indicator to a tentative state, and setting it to a confirmed state responsive to receiving acceptances from the predetermined subset of the invitees. In such an implementation, the meeting is confirmed in response to setting the state indicator to a confirmed state. Preferably, a calendar entry is generated for the meeting time that observably indicates (e.g., by "graying out" or otherwise) whether the state indicator is in a tentative state.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

FIG. 3 is a schematic illustration of some possible fields selected as used by the embodiment of FIG. 1.

DETAILED DESCRIPTION

Figure 1:
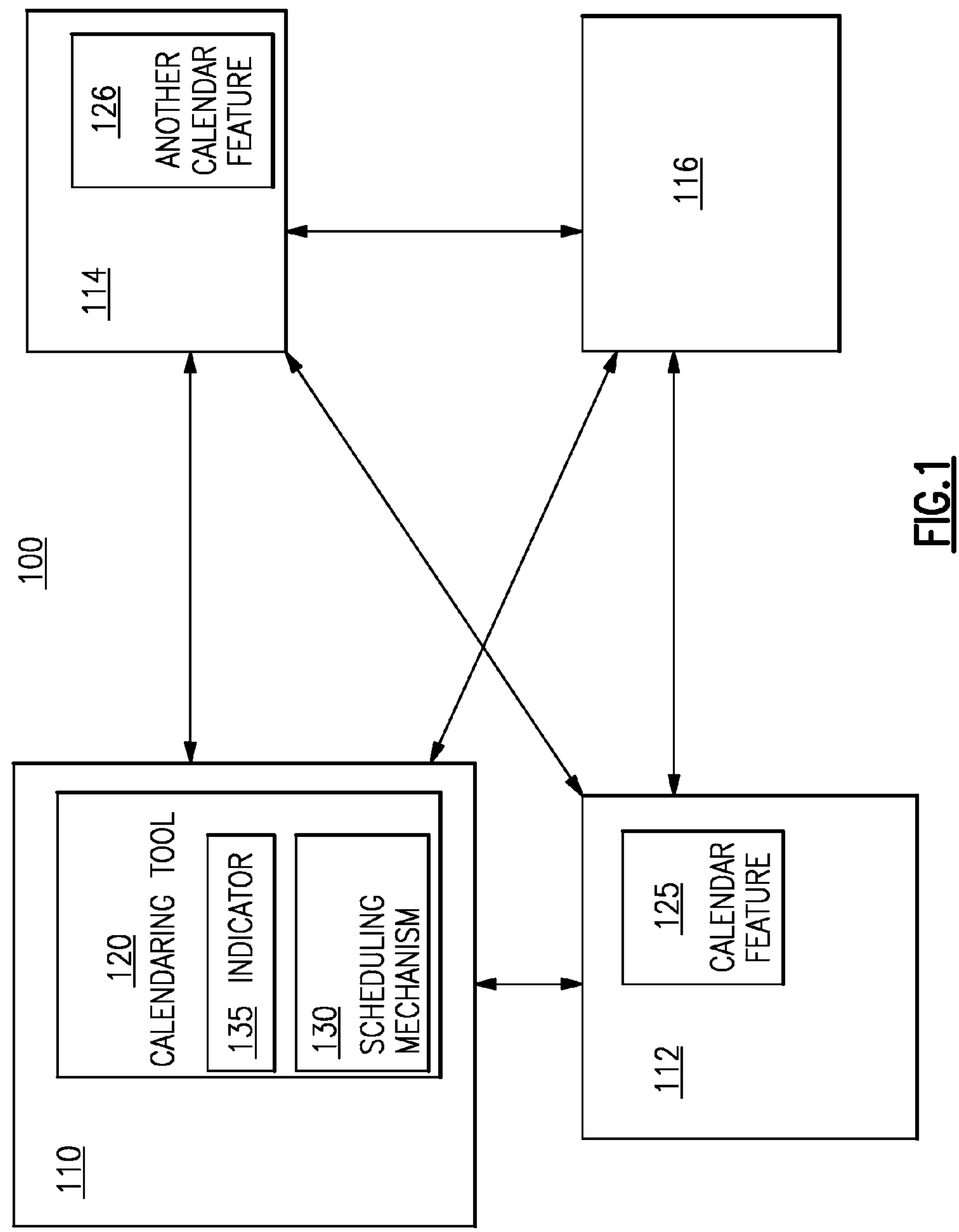
FIG. 1 is an illustration of a computing environment having nodes and/or processors in accordance with one embodiment of the present invention.

FIG. 1 shows a networked environment 100 having one or more nodes 110, 112, 114 and 116 assigned to respective individual users in an electronic mail (e-mail) and calendaring system, such as the Lotus® Notes® system available from IBM Corporation. In a preferred embodiment, each of nodes 110-116 comprises one or more processors running suitable software for implementing the disclosed method steps and having suitable input/output (I/O) functionality for interacting with the user as well as with other nodes. As shown in FIG. 1, nodes 110-116 are in processing communication with one another in the environment 100. One or more of the nodes 110-116 can also be in processing communication with nodes residing in other computing environments (not illustrated). Each node may be instantiated by a desktop or laptop computer or by a mobile device such as a smartphone, as is known in the art. Also, one or more of the functions described herein as being performed at a node may be performed by a server (not separately shown) rather than by a client machine or device. Since the nodes 110-116 may be conventional in their design except for the functionality described herein, their internal structure is not separately shown.

In one embodiment, as shown in FIG. 1, a calendaring tool 120 having a scheduling mechanism 130 is provided on at least one of the nodes 110-116. In the example shown, the node having the calendar tool is node 110. The other nodes 112-116 also may have some sort of calendaring feature, but that is not a requirement. For example, in FIG. 1, node 112 is provided with calendaring feature 125 and node 114 with calendaring feature 126. By contrast, node 116 does not have a calendaring feature at all. The calendaring features 125 (on node 112) and 126 (on node 114) may also differ than one another.

Calendaring tool 120 is enabled to process data and provide compatibility with other calendaring tools and features when provided. However, when a calendaring tool or feature is not provided, calendaring tool 120 is still enabled to create entries and process queries and receive information in the form of electronic messaging and mail and the like, as known to those skilled in the art, in order to create and update calendar entries.

As already noted, in a preferred embodiment the calendaring tool 120 on node 110 is the Lotus Notes program marketed by IBM Corporation. The originator of a meeting request (also referred to herein as the leader) uses a calendaring tool such as Lotus Notes to generate a list of invitees for a meeting to be held at a particular time and/or date. Conventionally, if one or more critical participants who must attend the meeting decline the invitation, the originator of the meeting must reschedule the meeting, often by sending out a new meeting invitation to all participants on the invitee list. In many cases, this results in e-mail reschedules that occur for all invitees, whether they are critical or noncritical/optional participants. There are several ways of resolving this problem, but none of these solutions provides an optimal solution. For example, in one scenario the meeting can be rescheduled using the very time-consuming and hands-on solution of first pre-scheduling the meeting with the critical participants in a first set of meeting invitations. Subsequent to this set of invitations, and only when the critical participants have responded and a tentative schedule has been established, the originator/leader of the meeting may invite the remaining noncritical or optional participants. In such a case, the originator/leader also has to disable certain calendaring features to make sure that these noncritical participants no longer have the ability to propose an alternative time should they not be able to attend. This resolution in such a case is performed manually, which is often time-consuming with little room for potential improvements and/or automation.

Another problem occurs in a different context. In certain situations, it may be desirable to have an established quorum of attendees for a particular meeting. Often, with certain types of meetings, such as in cases of committees, boards or other such gatherings, it is necessary for a quorum of participants to convene. For this class of meetings a fixed minimal number of participants are required to attend the meeting in order to conduct official business. Frequently, the participants are asked to vote for a particular result and because of that the attendance of the quorum is mandatory. It should be noted, however, that the quorum may be reached when a certain percentage of critical attendees have responded that they can attend the meeting. The individual attendees on the quorum, however, can be different at different times. For example, a full committee may include members U, V, W, X, Y and Z. To reach a quorum, half of the members must be present for any given meeting. However, in one meeting members U, V and W can be in attendance while at another meeting members X, Y and Z can be in attendance. While each time the required quorum is present, there are no required overlaps between the two sets of members in attendance. As before, the obvious manner of scheduling such meeting is time-consuming and filled with problems. For example, the originator may have to schedule the meeting and then manually tally up the list of those who can attend. If a quorum is not reached, the invitation has to be resent for a different time and date and the process repeated until a quorum is reached. Any last-minute cancellations and/or modification of the list of the attendees can then restart the process if such modification and/or late cancellation will prevent the reaching of the quorum.

Figure 3:
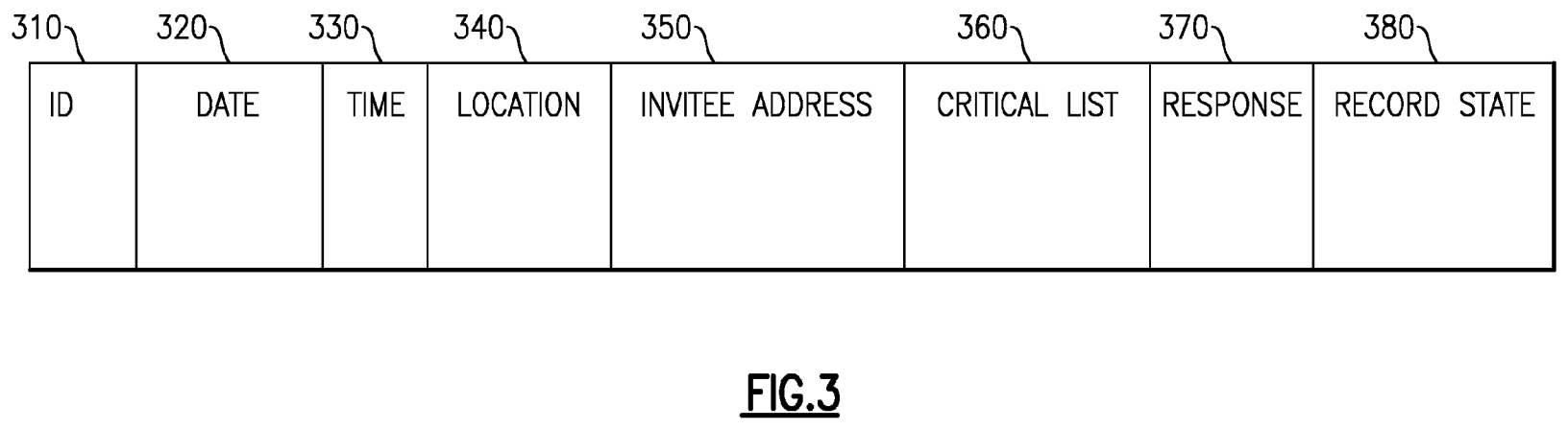

The present invention provides options and mechanisms to allow the originator/leader who schedules a meeting to send a preliminary invitation to the critical participants. The calendaring tool 120, as shown in FIG. 1, incorporates a scheduling mechanism 130 and an indicator 135. The calendaring tool 120 can establish one or more fields based on the selections of a meeting originator, which can be either a human or an automated tool. An example of such fields is shown in FIG. 3 and will also be later discussed. These or other such fields, for example, not only provide a date for the meeting and a list of participants, but can include other requirements. For example, a set of requirements can categorize invitees as critical or noncritical. Alternatively, the requirements can include information about the necessity of a quorum of attendees accepting the meeting invitation.

The mechanism 130 generates and sends invitations to at least a subset of invitees based on the requirements indicated in the fields. Once the meeting request is sent out, the indicator 135 indicates a tentative status, which is ultimately changed to a confirmed status once the expected responses are received from those invited to the meeting. Based on the requirements (such as provided in the fields) and type of responses received, the mechanism 130 then takes additional actions. Such actions may include finalizing the meeting, including additional invitees, providing additional information to the invitees based on their type of response, or rescheduling or cancelling the meeting.

In one embodiment, if responses are not received from the invited participants during a preselected time period, the mechanism may alert the originator and require further action, or automatically engage in alternative action as desired. Again, such action may include a number of scenarios such as rescheduling or cancelling the meeting.

The use of a preliminary invitation when the participants are categorized into critical and noncritical groups is advantageous in a number of situations. In one embodiment, preliminary invitations are sent only to the critical invitees. Only if these preliminary invitations are all accepted, and a confirmed status is set on the state indicator 135, is another set of invitations then sent to the noncritical invitees. This provides an automated option and also effectively reduces the e-mail clutter for all participants, both critical and noncritical/optional, especially when the meetings have to be rescheduled. Furthermore, it ensures that the noncritical participants do not get the meeting invitation until the prerequisite critical participants accept the meeting.

In a scenario where the number of attendees is important and a quorum needs to be reached, a different scheme can be used. In such a case, in one embodiment, a tentative status can be set and reached regarding the status of the meeting. The requirement for such a number/percentage comes into being once a preliminary invitation is sent and is not satisfied until the specified quorum number or percentage is reached accepting the meeting invitation. Once the specified quorum number is received, the meeting is marked as confirmed and a final invitation is sent and/or added directly to the invitees' calendars as appropriate. In case of a last-minute reschedule or modification, this process is then automatically conducted and a different date is selected or, if it is deemed that the quorum will be reached despite the modification and/or cancellation, no further action is taken. This provides certain advantages. For one, the participants to a meeting do not waste their time showing up for a meeting where the minimum quorum of participants are not or will not be in attendance. In addition, any last-minute changes and/or cancellations can be taken into account automatically so that adjustments can be appropriately made.

FIG. 3 shows an example of the fields of a meeting record 300 that stores participant and status information and can be used to control the scheduling of a meeting in accordance with embodiments of the present invention. Some or all of the depicted fields may be displayed to the originator/leader as the scheduling procedure progresses. As shown in FIG. 3, the fields of the meeting record 300 include originator/leader ID 310, meeting date 320, meeting time 330, meeting location 340, invitees (including address information if not obtained from a directory) 350, critical invitee list or quorum number 360, received responses 370 (separately tracked for each invitee), and an indicator ("record") state 380 (shown as indicator 135 in FIG. 1) for use by the tool 120.

Although shown as a single field in FIG. 3, the critical invitee list or quorum number 360 consists of two items of data: (1) an indication of whether certain invitees are critical or merely a certain number of acceptances (constituting a quorum) are required; and (2) an indication of the critical invitees or quorum number, as the case may be, depending on the first selection. Critical invitees can be indicated in any one of a number of ways. For example, rather than having a field separate from field 350 listing critical invitees, one could organize invitees 350 into separate sublists for critical and optional invitees or have a box next to each invitee that can be checked to set a "critical" bit to indicate that the particular invitee is critical. Also, the quorum can be expressed as either an absolute number (e.g., four invitees) or a fraction of the total number of invitees (e.g., 50% of the invitee list).

Figure 2:
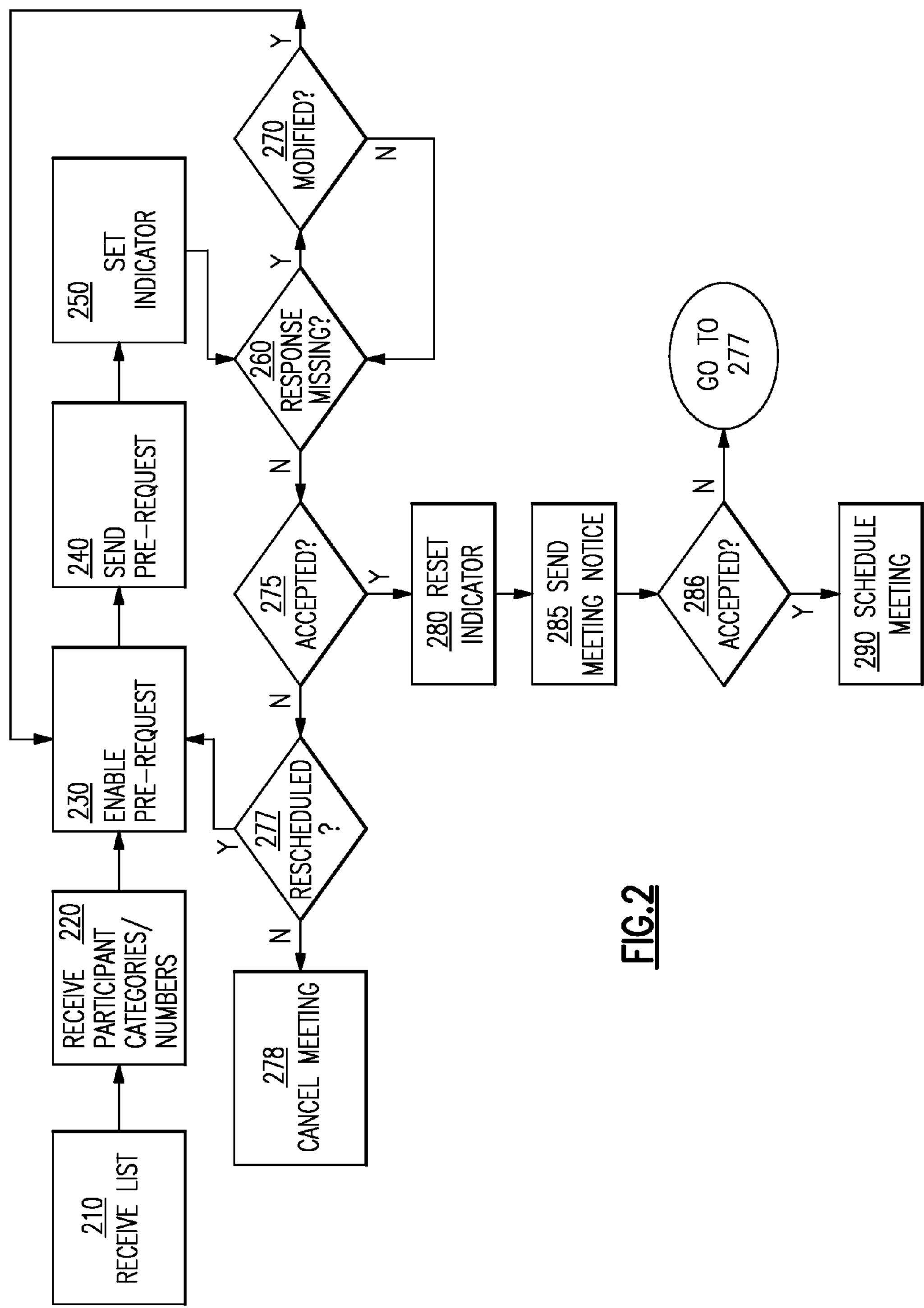
FIG. 2 is a flowchart illustration of processes of a calendaring tool in accordance with one embodiment of the present invention.

FIG. 2 is a flowchart of the operation of the calendaring tool 120 of FIG. 1 in accordance with one embodiment of the present invention. In step 210 in FIG. 2, in response to a meeting request from an originator/leader, the calendaring tool 120 prompts the originator/leader for a list of participants as well as other conventional meeting data such as date, time and location (e.g., by generating a display of blank fields to be filled out) and receives that data from the originator/leader. These inputs are used to populate fields 320, 330, 340 and 350 in FIG. 3. (The meeting request itself can be used to populate field 310.)

In step 220, the calendaring tool 120 receives from the originator/leader either a categorization of the participants as being critical or noncritical/optional or, alternatively, a required number to establish a quorum. This input is used to populate field 360 in FIG. 3. A variety of methods can be used to accomplish step 220, as indicated above. In any event, at the end this step, the calendaring tool 120 will have received a set of meeting requirements including at least a meeting time and a set of invitees, with the meeting requirements identifying each invitee as being either a critical invitee or a noncritical invitee or, alternatively, specifying a quorum of invitees attending the meeting. In this example, except where otherwise indicated, it will be assumed that the participants are identified as being either critical or noncritical participants.

In step 230, the calendaring tool 120 enables the meeting to be promoted to a "pre-request", or tentative, status. This can be accomplished in a number of ways as known to those skilled in the art. For example, the originator/leader can click on a send button or select other similar fields to enable the sending of preliminary invitations.

In step 240, responsive to this enablement, the tool 120 sends preliminary invitations to all invitees selected as critical participants or alternatively to all participants that are being considered for achieving a quorum. In some embodiments of the invention, the addresses of the recipients are known to the system and already selected. In other embodiments, the list is then reviewed and appropriate addresses of recipients generated from a larger list such as those related to a particular Internet or network service.

Thereafter, in step 250, the tool 120 sets the record state 380 (corresponding to the indicator 135 in FIG. 1) to a "pre-request", or "tentative", state. The calendaring tool 120 may also mark the originator/leader's calendar with an indicator observably (preferably visibly) specifying the pre-request or tentative status. The indicator can be a flag or an entry using a differently shaded font or highlighting or any other such distinguishing feature selectively chosen by the originator/leader at an earlier time and as known by those skilled in the art. For example, the time slot can be "grayed out" on associated calendar entries (especially those of invitees whose attendance is required) to indicate that the meeting time is tentative. Such a real-time indication of the effects of a movement of the calendar entry could help a calendar administrator recognize the consequences of moving the entry.

Once the critical participants receive the pre-request or tentative meeting invitations, they either respond or not by a certain date and/or time. Responses are received and processed by the tool 120 automatically, and reminders are generated and sent automatically to users who do not respond by a certain date/time. If repeated attempts to obtain a response from a particular invitee fail, then at step 260 the tool 120 can generate a message to the originator/leader. In such a case the originator/leader can take a variety of actions, such as cancelling the meeting or, at step 270, modifying the date 320, time 330 or location 340 of the meeting or modifying invitee list 350 (e.g., by modifying the address of the non-responding invitee or removing the invitee from the list altogether). In the event of any such modification, the procedure returns to step 230.

If no modifications and/or cancellations are made, the calendar tool 120 waits to receive all pre-request invitation responses. The tool 120 then analyses the responses as indicated in step 275.

Step 275 is reached if all critical invitees have responded, one or more critical invitees have responded negatively or, optionally, a predetermined time period for reply has elapsed. If one or more critical invitees (or a number sufficient to defeat a quorum) have responded negatively, or if the time limit for reply has elapsed and all critical invitees (or a number sufficient to constitute a quorum) have not responded positively, then the flow advances to step 277, where the originator/leader may choose to cancel the meeting or reschedule it. If the originator/leader chooses to cancel the meeting, then at step 278 the tool 120 sends appropriate cancellation notices to the invitees to whom invitations have already been sent, and the program terminates. If, on the other hand, the originator/leader opts at step 277 to reschedule the meeting, then the originator/leader updates date and time fields 320 and 330 as appropriate (and possibly other fields as well, such as the critical list 360), and the flow returns to step 230 where it proceeds as before.

The flow moves to step 280 if either all critical invitees or the minimum number of attendees for a quorum, as the case may be, have accepted. In such event, the calendaring tool 120 sets the record state 370 (shown as indicator 135 in FIG. 1) to indicate that the meeting has moved from the pre-request or tentative state to an accepted or confirmed state.

Optionally, following step 280, the leader/originator is given another chance to change, cancel or modify the meeting as appropriate. If no changes are made, then in step 285 the tool 120 sends out a final meeting notice. In one embodiment, this final meeting notice is sent to all invitees, even those who have previously responded. Alternatively, as discussed below, the confirmation notice is sent only to those invitees (non-critical, or in excess of a quorum) who have not already accepted.

If at step 286 the meeting notice sent at step 285 is accepted (in the sense indicated for step 275), then the tool 120 proceeds to schedule the meeting at step 290. Otherwise, the flow returns to step 277, where the originator/leader may again decide whether to reschedule or cancel.

In one embodiment of the present invention, the initial meeting notice sent in step 240 only includes minimal information about the meeting as selected by the originator/leader. The final meeting notice when sent can include additional information and/or attachments. For example, a final meeting notice may attach a set of charts and/or a particular presentation to it. Sending large files and/or presentations with the initial notice clogs the participants' mail, especially if the files are large. In one embodiment of the invention, such attachments or information are preselected by the user at the time of attendee list generation and designation. In an alternative embodiment, the originator/leader can modify or add to the information that is sent to all participants once the initial meeting notice is accepted. For example, the location of the meeting can be added or altered or a file can be attached at a later date once the originator/leader is assured that the meeting will occur at a particular date and time.

In an alternative embodiment, if no further action is to be taken, the final meeting notice is only sent to the noncritical participants once the critical participants have accepted the invitation. This is to prevent the critical attendees from receiving two or more invitations that can clog their database.

In an alternative embodiment of the present invention, a set of dates can be preselected by the originator/leader at the outset and, in case of a decline, the tool 120 automatically resends a pre-request meeting notice to those in the critical list. In such a case the meeting dates are picked from a preselected priority generated by the originator/leader. All preselected dates are then tried before the originator/leader is notified that none of the dates meet all critical participants' acceptance. Alternatively, if one or more of the preselected dates are accepted, this new date is used and the originator/leader is notified and his or her calendar is updated automatically.

In both cases, in one embodiment, prior to sending of the final meeting notice, the originator/leader can also decide to cancel or reschedule the date prior to all invitations going out.

In an alternative embodiment, the tool 120 is enabled to check calendar entries of participants on the critical list automatically and provide availability to the originator/leader prior to the pre-request invite being sent to the critical participants. In one embodiment, the tool 120 generates a list of first available date and time slot in accordance with availability indicated on the calendars of all critical participants. Subsequent availabilities after this date are then also provided as an automated aid to the originator/leader to select an appropriate date that can potentially yield the most amount of accepts. As discussed this process is completed prior to when step 230 and/or 240 is performed in FIG. 2.

In one embodiment, the tool 120 can be designed to indicate to the originator/leader the responses and the updating of the meeting record as one state is being changed to another. This can be done at several levels. In one embodiment, the originator/leader can be informed of the response of each invitee as it comes in. In another embodiment, the tool 120 itself tracks responses at the individual level, as in the first embodiment, but the originator/leader is only informed of responses that result in a change in the record state 380—for example, an acceptance by a last critical invitee, a refusal by a critical invitee, or the establishment or defeating of a required quorum. This can be accomplished, for example, by updating the meeting record 300 (FIG. 3) to set record state 380 to "pre-request" and the response 370 of the accepting invitee to "accept", while leaving everything else the same.

While the invention has been described in accordance with certain preferred embodiments thereof, those skilled in the art will understand the many modifications and enhancements which can be made thereto without departing from the true scope and spirit of the invention, which is limited only by the claims appended below.

What is claimed is:

1. A computer-implemented method for arranging a meeting in a networked environment having nodes assigned to respective individual users, each of said nodes comprising one or more processors, said method being performed by one or more processors at one of said nodes and comprising:

receiving a set of meeting requirements from a user at said one of said nodes, said requirements including at least a meeting time and a set of invitees and specifying a subset of said invitees by identifying invitees in said subset as critical employees;

sending invitations for a meeting at said meeting time only to the invitees identified as critical invitees at the nodes of said networked environment assigned to said invitees based on one or more of said meeting requirements;

confirming said meeting at said meeting time responsive to receiving acceptances from all of the invitees identified as critical invitees at the nodes of said networked environment assigned to said invitees, wherein the conforming comprises sending invitations to invitees not identified as critical invitees; and rescheduling or cancelling said meeting responsive to a failure to receive acceptances from all of the invitees identified as critical invitees at the nodes of said networked environment assigned to said invitees.

2. The method of claim 1, wherein the rescheduling or cancelling is performed responsive to a failure to receive acceptances from all of the invitees identified as critical invitees within a predetermined period of time.

3. The method of claim 1, wherein the rescheduling or cancelling is performed responsive to receiving a refusal from an invitee identified as being a critical invitee.

4. The method of claim 1, further comprising:

setting a state indicator to a tentative state; and setting said state indicator to a confirmed state responsive to receiving acceptances from all of the invitees identified as being critical invitees.

5. The method of claim 4, wherein said confirming is performed in response to setting of said state indicator to a confirmed state.

6. The method of claim 4, wherein a calendar entry is generated for the meeting time that observably indicates whether the state indicator is in a tentative state.

* * * * *